Patented June 4, 1929.

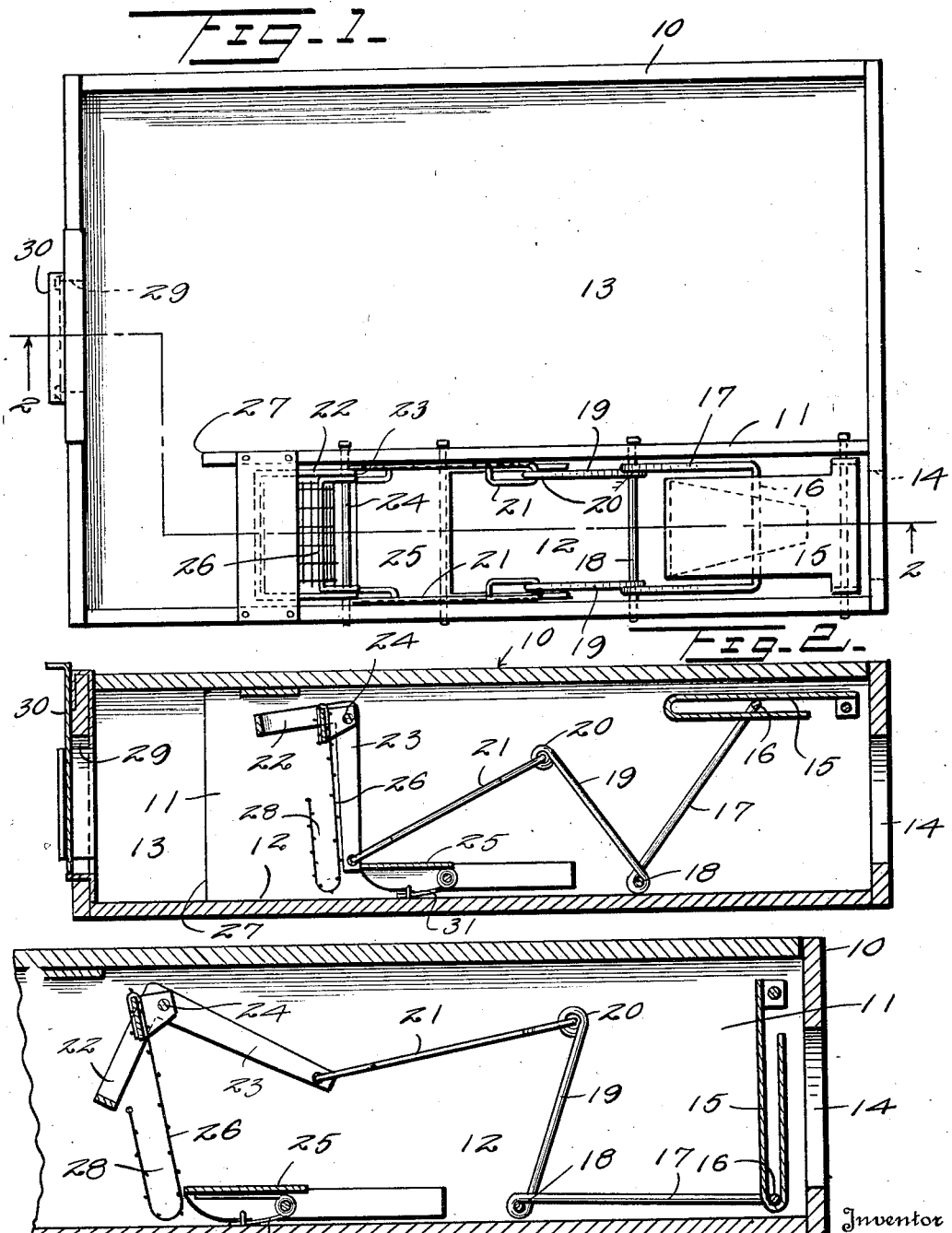

1,715,445

UNITED STATES PATENT OFFICE.

JAMES E. BAUM, OF LISCO, NEBRASKA.

ANIMAL TRAP.

Application filed November 23, 1927. Serial No. 235,308.

This invention relates to new and useful improvements in traps, and particularly to animal traps.

One object of the invention is to provide a trap wherein the animal resets the trap, after having been trapped, so that a subsequent animal may freely enter the trap.

Another object is to so arrange a barrier, and bait, that the animal will spring the trap, upon attempting to reach the bait, thereby forcing the animal to proceed past the barrier, which readily moves in one direction.

Another object is to provide a barrier movable in one direction, which is adapted to be moved by the animal, in its effort to reach the bait, and which automatically restores the trap to a position which permits another animal to enter therein.

Other objects and advantages will be apparent from the following description when taken in connection with the accompanying drawing.

In the drawing:

Figure 1 is a plan view of the trap in set position, the cover being removed, and partly in section.

Figure 2 is a vertical longitudinal sectional view on the line 2—2 of Figure 1.

Figure 3 is a similar sectional view showing the trap sprung.

Referring particularly to the accompanying drawing, 10 represents a cage or box, which is provided with a longitudinal partition 11, separating the box into two compartments 12 and 13, the former of which serves as the entry, through which the animal passes, after having entered through the opening 14, in one end wall of the box, while the other compartments serves as a storage space for trapped animals, until such time as they may be removed for destruction. Pivotally supported above the opening 14, and arranged to swing downwardly into closing relation thereto, is a door 15, formed of sheet metal, and doubled on itself, with the portions thereof slightly separated, for the reception therebetween of the bight portion 16, of the wire yoke 17. This yoke has the ends of its arms pivotally supported on a transverse shaft 18, which extends through the side wall of the box, and said partition, adjacent the bottom of the box. Extending at an acute angle from the pivotal portion of each of the arms of the yoke 17, and lying in the plane of said arm, is the arm 19, which is terminally formed with an eye 20, in which is received an end of a wire link 21. A yoke 22, having each of its arms in the form of a bell crank lever 23, is pivotally supported on a transverse shaft 24, which is disposed through the said side wall of the box, and the said partition 11, this shaft, however, being arranged adjacent the upper portions of said walls, and at a suitable distance inwardly of the entrance opening 14. It will be noted that one arm of each of the bell crank levers 23 extends downwardly, and that the adjacent or other end of a link 21 is pivotally connected therewith. It will further be noted that there remains a small portion of the end of each of the said arms of the bell crank levers, below the connection of the links. Pivotally mounted adjacent the floor of the compartment 12, is a tiltable platform 25, the forward, or inner end of which is arranged to engage with the before-mentioned projecting portions of the arms of the bell cranks, whereby, when the said platform is in elevated, or set position, its forward edge retains the yoke 22 against pivotal movement, until released by the depression of the platform under the weight of an animal. A door 26, formed preferably of wire screen, is pivotally suspended on the said shaft 24, and has its lower end in position to lie against the forward edge of the platform, whereby to prevent movement of the door in the direction of said platform, while permitting free swinging movement thereof away from the platform, so as to permit an animal to pass over the platform, and enter the compartment 13, through the passage way 27, formed between the inner end of the partition 11, and the adjacent end of the box. When the parts are in the position thus described, the door 15 is in elevated position, held by the elevated bight portion of the yoke 17. An animal can then freely enter through the opening 14, as will be evident. A bait receptacle 28 is formed on the inner face of the screen door 26, which the animal attempts to reach by passing over the platform 25. Immediately upon the animal placing his weight on the platform, such platform will tilt whereby to move the forward end of the platform below the ends of the arms of the yoke 22, whereby the weight of the door 15 will cause the same to swing into closing position inwardly of the opening 14, and at the same time rock the yoke 17 so that its bight portion slides down to the lower edge of such door, thereby preventing any attempt to swing the door inwardly from the outside. The animal is thus trapped between the door 15 and the screen door 26, with the result that escape through the opening 14 is prevented. The animal then attempts to reach the bait, by stepping on and depressing the platform, with the result that he may swing the door 26 inwardly and enter the inner end of the chamber, or compartment 12. When the door 26 swings back into its normal position, it rests against the forward edge of the platform, thereby preventing the animal moving the door in an attempt to get back into the compartment 12. The only course left for the animal is to pass into the compartment 13. On one end wall of the compartment 13 there is formed an opening 29, closed by a removably arranged slidable door 30, through which the animals may be removed for destruction. Thus, each time an animal enters the trap, and passes beyond the door 26, the trap is reset for the next animal, with the result that the trap is always ready for the entrance of an animal.

Beneath the platform there is disposed a spring 31 which yieldably maintains the platform in elevated position, for stopping engagement with the door 26.

What is claimed is:

1. An animal trap including an enclosure having an entrance opening, a door controlling said opening, a swinging barrier arranged inwardly of the door, a trip adjacent the barrier and normally holding the latter from movement in one direction, a yoke mounted in the enclosure and movably connected with the door for opening and closing the same, a second yoke mounted in the enclosure, connections between the yokes, the bight of the second yoke being arranged in the path of the barrier whereby to be engaged and moved thereby when an animal moves said barrier to restore the said door to open position.

2. An animal trap including an enclosure having an entrance opening, a door movable toward and away from the opening, a swinging barrier mounted inwardly of the door, a trip operable by an animal normally holding the barrier against movement in one direction, a yoke adjacent the barrier and having its bight arranged to be engaged by said barrier upon movement of the latter in one direction by an animal, said trip normally engaged with the said yoke, and connections between the yoke and said door whereby upon depression of the trip the door will be closed, and upon movement of the barrier by an animal the door will be opened.

In testimony whereof, I affix my signature.

JAMES E. BAUM.